J. Isenberg,
Boring Wood.
Nº 62,491.     Patented Feb. 26, 1867.
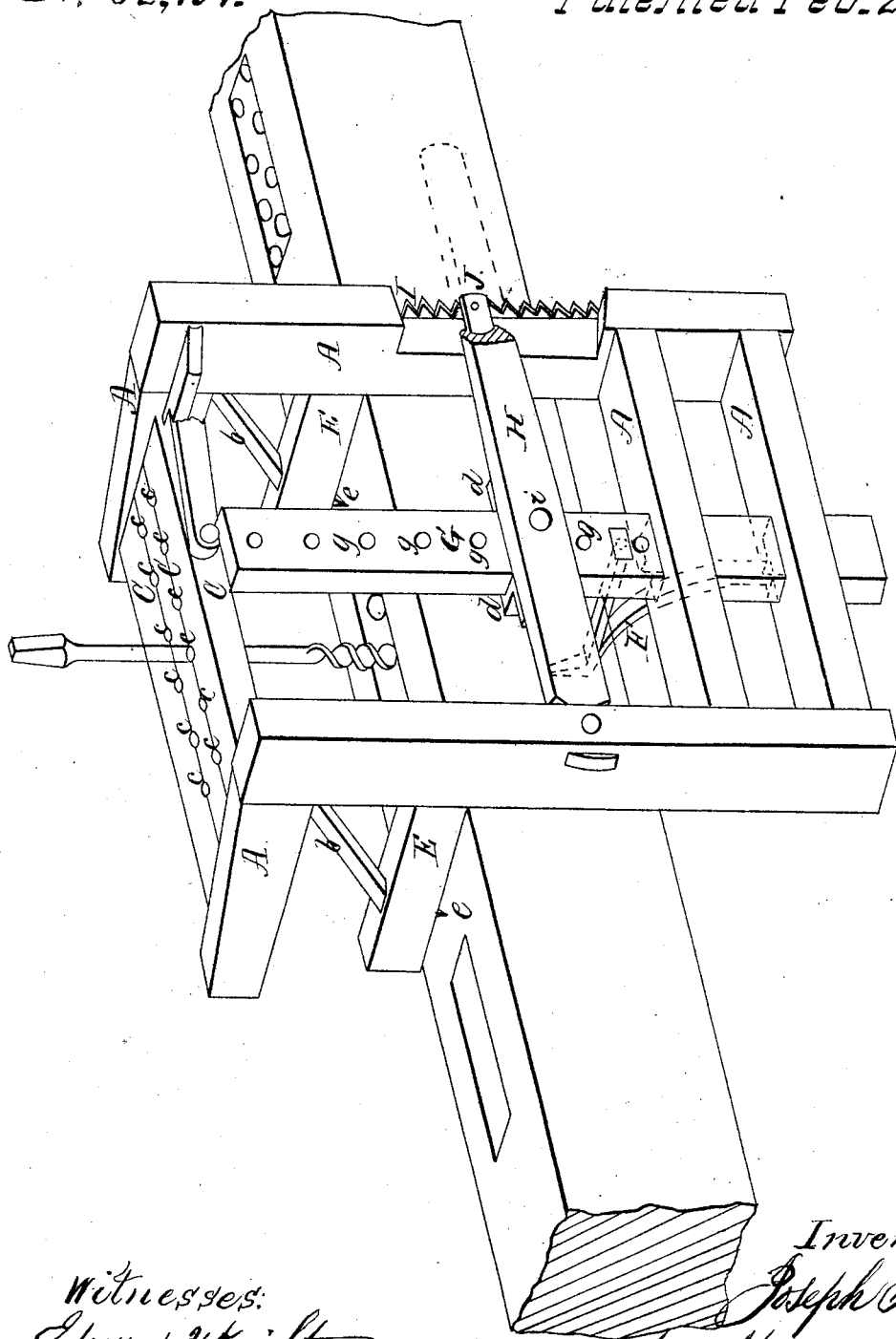
Witnesses:
Edward H Knight
John C. Kenmon
Inventor:
Joseph Isenberg
per Munn & Co
Attorneys.

United States Patent Office.

JOSEPH ISENBERG, OF McCONNELLSTOWN, PENNSYLVANIA.

Letters Patent No. 62,491, dated February 26, 1867.

IMPROVEMENT IN BORING MACHINES.

*The Schedule referred to in these Letters Patent and making part of the same.*

TO ALL WHOM IT MAY CONCERN:

Be it known that I, JOSEPH ISENBERG, of McConnellstown, in the county of Huntingdon, and State of Pennsylvania, have invented a new and improved Boring Machine; and I do hereby declare the following to be a full, clear, and exact description of the same, sufficient to enable one skilled in the art to which the invention appertains to make use of it, reference being had to the accompanying drawings, which form a part of this specification, and in which my invention is represented by a perspective view.

This machine is adapted for attachment to a piece-framing timber, and has in adjustable jaws a series of holes, which act as guides of distance and verticality for the auger in boring for mortise holes. It is attached to the timber by spiked arms above and a clamp below, operated and fastened by a locking lever.

In the drawings, A are the pieces forming the frame of the machine; arms, E, project therefrom, having spikes, $e$, to penetrate the upper surface of the timber, and braces, $b$, to strengthen them. G is an upright bar passing through the mortises in the horizontal bars of the frame A; it is attached to the lever H by the box $d$ and pin $i$. The clamp F projects from the bar G, and carries at its end a point, which sinks into or catches against the under surface of the timber when the lever H is raised. The position of the lever is maintained by the catch J, which engages with the notches of the plate I. The bar G is adjustable for different thicknesses of timber by means of the holes $g\ g$. Between the upper horizontal bars of the frame are three jaw pieces, C C C; the ends of these are grooved so as to slip upon the pin B, to confine the shank of the auger, which is embraced in the openings $c\ c\ c$, half of each of which are in the adjacent jaws, which are locked by the latch D.

In operation, the timber having been laid off or marked for the mortises, the machine is adjusted upon it so that either of the insides of the frame will be in range with one end of the mortise. The holes may be varied in their distance in the row and between the rows; but a convenient form is to so arrange that one row is adapted for a mortise two inches from the face of the stick, and the second row when it is three inches from the face of the stick. The end holes may be one inch from the frame, and the holes otherwise two inches from centre to centre; variable jaws may be provided. When about to bore, the button D will be lifted, the jaw opened, and the shank of the auger placed in one of the holes C, the jaw and button closed, and the auger being turned, preferably by a crank, until the required depth is reached, it is then withdrawn, the button is raised, the jaw opened, and the shank of the auger placed in the next hole, and so on.

Having described my invention, what I claim as new, and desire to secure by Letters Patent, is—

The arrangement of the jaws C C, (two or more,) the clamps E E F, lever H, catch I, and adjustable bar G, constructed and operating substantially as described and represented.

JOSEPH ISENBERG.

Witnesses:
ABRAHAM SNARE,
ISAAC LONG.